United States Patent
Lou et al.

(10) Patent No.: US 10,477,319 B2
(45) Date of Patent: Nov. 12, 2019

(54) WEARING STATE DETECTION METHOD FOR WEARABLE DEVICE, AND WEARABLE DEVICE

(71) Applicant: Goertek Inc., Shandong Province (CN)

(72) Inventors: Shasha Lou, Shandong Province (CN); Na Li, Shandong Province (CN); Bo Li, Shandong Province (CN)

(73) Assignee: Goertek, Inc., Shandong Province (CN)

(*) Notice: Subject to any disclaimer, the term of this patent is extended or adjusted under 35 U.S.C. 154(b) by 0 days.

(21) Appl. No.: 16/304,623

(22) PCT Filed: Jun. 12, 2017

(86) PCT No.: PCT/CN2017/087897
§ 371 (c)(1),
(2) Date: Nov. 26, 2018

(87) PCT Pub. No.: WO2018/019043
PCT Pub. Date: Feb. 1, 2018

(65) Prior Publication Data
US 2019/0215611 A1    Jul. 11, 2019

(30) Foreign Application Priority Data
Jul. 29, 2016 (CN) .......... 2016 1 0624325

(51) Int. Cl.
*H04R 1/10*    (2006.01)
*G06F 3/01*    (2006.01)
(Continued)

(52) U.S. Cl.
CPC ............. *H04R 5/04* (2013.01); *G06F 1/3231* (2013.01); *G06F 1/3296* (2013.01); *G06F 3/011* (2013.01);
(Continued)

(58) Field of Classification Search
CPC .......... H04R 3/00; H04R 25/00; H04R 25/30; H04R 29/00; H04R 5/00; H04R 5/04;
(Continued)

(56) References Cited

U.S. PATENT DOCUMENTS 8,223,024 B1   7/2012 Petrou
2014/0044275 A1  2/2014 Goldstein et al.
(Continued)

FOREIGN PATENT DOCUMENTS

CN   105122182 A   12/2015
CN   105302541 A   2/2016
(Continued)

OTHER PUBLICATIONS

International Bureau of WIPO, International Search Report for Application No. PCT/CN2017/08797, dated Sep. 13, 2017.

*Primary Examiner* — Thang V Tran
(74) *Attorney, Agent, or Firm* — LKGlobal | Lorenz & Kopf, LLP

(57) ABSTRACT

A wearing state detection method for a wearable device and a device. The detection method comprises: providing in the wearable device a sensor in an area capable of contacting the skin of a user, wherein the sensor outputs different measurement values when the user wears or takes off the wearable device; acquiring a base value indicating whether the wearable device is being worn; after wearing detection has been started up, collecting measurement values from the sensor at a preset sampling frequency; judging whether the wearable device is currently in a wearing state according to the measurement values and the base value; and controlling the wearable device to turn off a corresponding function that is running when the wearable device is in a non-wearing state. The method and the device can reduce the power consumption and simplify user operation.

12 Claims, 4 Drawing Sheets

(51) Int. Cl.
*H04R 29/00* (2006.01)
*H04R 5/04* (2006.01)
*H04R 5/033* (2006.01)
*G06F 1/3296* (2019.01)
*G06F 1/3231* (2019.01)

(52) U.S. Cl.
CPC ......... *H04R 5/033* (2013.01); *H04R 2420/07* (2013.01); *H04R 2460/03* (2013.01)

(58) Field of Classification Search
CPC ............... H04R 5/033; H04R 2420/07; H04R 2460/03; G06F 3/011; G06F 1/3231; G06F 1/3234; G06F 1/3296; G06F 1/163; H04S 7/00; H04S 7/302; H04S 7/303; H04S 7/304; H04W 4/38
See application file for complete search history.

(56) References Cited

U.S. PATENT DOCUMENTS

| | | | | |
|---|---|---|---|---|
| 2014/0313863 | A1* | 10/2014 | Lee | G04G 9/0005 368/10 |
| 2014/0314247 | A1* | 10/2014 | Zhang | H04R 1/1041 381/74 |
| 2015/0168921 | A1 | 6/2015 | Lee et al. | |
| 2015/0201854 | A1* | 7/2015 | Hong | A61B 5/02427 600/301 |
| 2016/0022201 | A1* | 1/2016 | Arnold | A61B 5/1123 600/301 |
| 2016/0026211 | A1 | 1/2016 | Luna | |
| 2016/0041048 | A1* | 2/2016 | Blum | G01L 1/2206 73/774 |
| 2016/0098017 | A1* | 4/2016 | Park | G04G 21/04 368/10 |
| 2016/0162256 | A1 | 6/2016 | Komaromi et al. | |
| 2017/0301214 | A1* | 10/2017 | Chen | A61B 5/6843 |
| 2017/0366655 | A1* | 12/2017 | Thompson | H04W 76/14 |
| 2018/0039086 | A1* | 2/2018 | Jiang | G02B 27/0101 |
| 2018/0132028 | A1* | 5/2018 | Nakai | H04R 1/1033 |

FOREIGN PATENT DOCUMENTS

| | | |
|---|---|---|
| CN | 105554616 A | 5/2016 |
| CN | 105677012 A | 6/2016 |
| CN | 106291121 A | 1/2017 |
| CN | 205941703 U | 2/2017 |

\* cited by examiner

WEARING STATE DETECTION METHOD FOR WEARABLE DEVICE, AND WEARABLE DEVICE

CROSS REFERENCE TO RELATED APPLICATIONS

This application is a U.S. National Stage entry under 35 U.S.C. § 371 based on International Application No. PCT/CN2017/087897, filed on Jun. 12, 2017, which was published under PCT Article 21(2) and which claims priority to Chinese Patent Application No. 201610624325.6, filed on Jul. 29, 2016. These applications are hereby incorporated herein in their entirety by reference.

TECHNICAL FIELD

This Application pertains to the field of wearable devices, and particularly relates to a wearing state detection method for a wearable device and a wearable device.

BACKGROUND

Wearable devices are a development hotspot in the recent years, such as smart wristbands, smart watches and smart earphones. The wearing state detection of wearable devices is an important function that wearable devices are required to have, and according to the detection result of the wearing state some functions can be controlled or optimized; for example, the misjudgment of stillness to sleeping can be avoided according to the wearing state of a wristband. Specially, regarding smart earphones, wearing state detection is a very important function. Smart earphones employ Bluetooth or WiFi (Wireless Fidelity, a wireless local area network on the basis of the IEEE 802.11b standard) wireless modules, which reduces the trouble of electrical wires, and can make telephone calls, music listening and so on more comfortable. However, the wireless modules have a big power consumption, which makes the service time of smart earphones short. Accordingly, the users hope that when the smart earphone is not being worn, the application programs that are running in the smart earphone can stop, to reduce the power consumption.

Regarding the wearing state detection of wearable devices, the prior art usually employs a mechanic key to conduct the controlling, which solution has the following disadvantages: the first is that the frequent using of the mechanic key causes the wear and tear of the mechanic key, which reduces its life and affects its esthetic appearance; the second is that to operate the mechanic key, it is required to see the location of the key before an effective operation, which is troublesome; and the third is that the user may probably forget to turn off the wearable device, which results in that when not being used, the application programs in the wearable device are still running; for example, a music is being played all along.

Therefore, how to accurately detect whether the wearable device is in the wearing state is a vitally important presupposing task, and if the detection is not accurate, that may bring the user uncomfortable experience, and more severely, may adversely affect the usage effect of the wearable device. In addition, other objects, desirable features and characteristics will become apparent from the subsequent summary and detailed description, and the appended claims, taken in conjunction with the accompanying drawings and this background.

SUMMARY

In view of the above problems, the embodiments of the present disclosure provide a wearing state detection method for a wearable device and a wearable device, to solve the above problems or at least partly solve the above problems.

According to an aspect of the embodiments of the present disclosure, there is provided a wearing state detection method for a wearable device, wherein the method comprises:

providing in the wearable device a sensor in an area capable of contacting the skin of a user, wherein the sensor outputs different measurement values when the user wears or take off the wearable device;

acquiring a base value indicating whether the wearable device is being worn;

collecting a measurement value from the sensor according to a preset sampling frequency after wearing detection has been started up;

judging whether the wearable device is currently in a wearing state according to the measurement value and the base value; and when the wearable device is in a non-wearing state, controlling the wearable device to turn off a corresponding function that is running.

Optionally, the judging whether the wearable device is currently in a wearing state according to the measurement value and the base value comprises:

acquiring a smoothed value that corresponds to each of the collected measurement values;

regarding a current measurement value, judging whether the current measurement value is in a stable state;

when the current measurement value is stable, judging whether all of a preset number of measurement values before and after the current measurement value are in the stable state, or, judging whether all of a preset number of measurement values before the current measurement value are in the stable state; and if yes, judging whether the wearable device is currently in the wearing state according to a smoothed value that corresponds to the current measurement value and the base value.

Optionally, the acquiring a smoothed value that corresponds to each of the collected measurement values comprises:

regarding a current measurement value, comparing the current measurement value with a measurement value that was collected the previous time, and judging whether an absolute value of a difference therebetween is less than a first preset threshold;

if yes, calculating the smoothed value that corresponds to the current measurement value by using a smoothed value that corresponds to the measurement value that was collected the previous time and the current measurement value; and if not, using the smoothed value that corresponds to the measurement value that was collected the previous time as the smoothed value that corresponds to the current measurement value.

Optionally, the judging whether the current measurement value is in a stable state comprises:

comparing the current measurement value and the smoothed value that corresponds to the current measurement value, and judging whether an absolute value of a difference therebetween is less than a second preset threshold;

if yes, determining that the current measurement value is in the stable state; and if not, determining that the current measurement value is in an unstable state.

Optionally, the judging whether the wearable device is currently in the wearing state according to a smoothed value that corresponds to the current measurement value and the base value comprises:

comparing the smoothed value that corresponds to the current measurement value and the base value, and when a value of a difference therebetween is greater than a third preset threshold, determining that the wearable device is currently in the wearing state;

wherein the base value indicates that the wearable device is not being worn.

Optionally, the judging whether the wearable device is currently in the wearing state according to a smoothed value that corresponds to the current measurement value and the base value further comprises:

if the value of the difference between the smoothed value that corresponds to the current measurement value and the base value is not greater than the third preset threshold, acquiring a result of the wearing state detection of the wearable device of the previous time;

if the result of the detection of the previous time is that the wearable device is in the non-wearing state, determining that the wearable device is currently in the non-wearing state; and if the result of the detection of the previous time is that the wearable device is in the wearing state, judging whether a value of a difference between a maximum value among smoothed values that correspond to a preset number of measurement values before the current measurement value and the smoothed value that corresponds to the current measurement value, exceeds a fourth preset threshold, and if yes, determining that the wearable device is currently in the non-wearing state, and if not, determining that the wearable device is currently in the wearing state.

Optionally, the method further comprises:

when it is determined that a base value updating condition is satisfied, updating the base value; and conducting a wearing state detection of the next time of the wearable device by using the updated base value;

wherein when the base value indicates that the wearable device is not being worn, the base value updating condition is:

when the current measurement value is in the stable state, all of the preset number of measurement values before and after the current measurement value are in the stable state or all of the preset number of measurement values before the current measurement value are in the stable state, and it is determined that the wearable device is currently in the non-wearing state, or, when the current measurement value is less than a fifth preset threshold; and when the base value indicates that the wearable device is being worn, the base value updating condition is:

when the current measurement value is in the stable state, all of the preset number of measurement values before and after the current measurement value are in the stable state or all of the preset number of measurement values before the current measurement value are in the stable state, and it is determined that the wearable device is currently in the wearing state, or, when the current measurement value is greater than a preset threshold.

Optionally, the updating the base value comprises: calculating a preliminary base value by using the current measurement value and the base value;

comparing the preliminary base value and the smoothed value that corresponds to the current measurement value, and if the preliminary base value is greater than the smoothed value, updating the base value by using the smoothed value; and if the preliminary base value is less than the smoothed value, updating the base value by using the preliminary base value.

According to another aspect of the embodiments of the present disclosure, there is provided a wearable device, wherein the wearable device comprises: a sensor and a control circuit;

the sensor is provided in a area in the wearable device capable of contacting the skin of a human body, wherein the sensor outputs different measurement values when the user wears or takes off the wearable device;

the control circuit comprises: a collecting module, a detecting and processing module and an outputting control module;

the collecting module connects to the sensor, and after wearing detection has been started up, the collecting module collects measurement values from the sensor at a preset sampling frequency;

the detecting and processing module connects to the collecting module, and the detecting and processing module receives the measurement values that are collected by the collecting module, acquires a base value indicating whether the wearable device is being worn, and judges whether the wearable device is currently in a wearing state according to the measurement values and the base value; and the detecting and processing module connects to the outputting control module, the detecting and processing module notifies the outputting control module when detecting that the wearable device is in the non-wearing state, and the outputting control module controls the wearable device to turn off a corresponding function that is running.

Optionally, the detecting and processing module acquires a smooth value that corresponds to each of the measurement values that are collected by the collecting module, regarding a current measurement value, judges whether the current measurement value is in a stable state, and when the current measurement value is stable, judges whether all of a preset number of measurement values before and after the current measurement value are in the stable state, or, judges whether all of a preset number of measurement values before the current measurement value are in the stable state; and if yes, judges whether the wearable device is currently in the wearing state according to the smoothed value that corresponds to the current measurement value and the base value.

Optionally, the wearable device is a smart earphone, and the smart earphone comprises an earphone tail and an earphone cover;

the control circuit is provided in the earphone tail; and a protrusion is provided on an inner edge of the earphone cover for clipping the earphone cover, and the protrusion protrudes toward a side of the earphone cover; and the sensor is provided at a top of the protrusion.

Optionally, the sensor is a capacitive sensor formed by a copper foil, and a shape of the copper foil is a closed loop shape or an unclosed loop shape.

It can be known from the above that the technical solution provided by the embodiments of the present disclosure realizes a novel wearing detection approach by providing a sensor at a proper location of the wearable device, using the characteristic that the sensor outputs different measurement values when the user wears or takes off the wearable device, and by combining the base value and a control logic. The present solution has a highly accurate wearing detection result, improves the usage comfort of the wearable device while reducing unnecessary power consumption of the wearable device as much as possible, and can automatically stop a corresponding function that is running in the wearable device without any manual operation of the user when the wearable device has been taken off, which simplifies the operation of the user, improves the intellectualization, and meets the usage demand of the wearable device.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In order to make the objects, the technical solutions and the advantages of the embodiments of the present disclosure clearer, the embodiments of the present disclosure will be described below in further detail in conjunction with the drawings.

The present solution is proposed in view of the problems in wearing detection, and its purpose is to improve the accuracy of the wearing state detection of the wearable device. The present solution improves the accuracy of the wearing state detection by using a sensor that can detect whether a device is being worn such as a capacitive sensor through an anti-interference algorithm and an anti-interference flow control method, and thus controls some functions of the wearable device such as music playing, lighting and extinguishing of a lamplight, and on/off of ANC (Active Noise Control) according to the wearing state of the wearable device, which can reduce the power consumption, avoid the wear of the mechanic keys, and bring the user more convenience and comfort experience.

Figure 1:
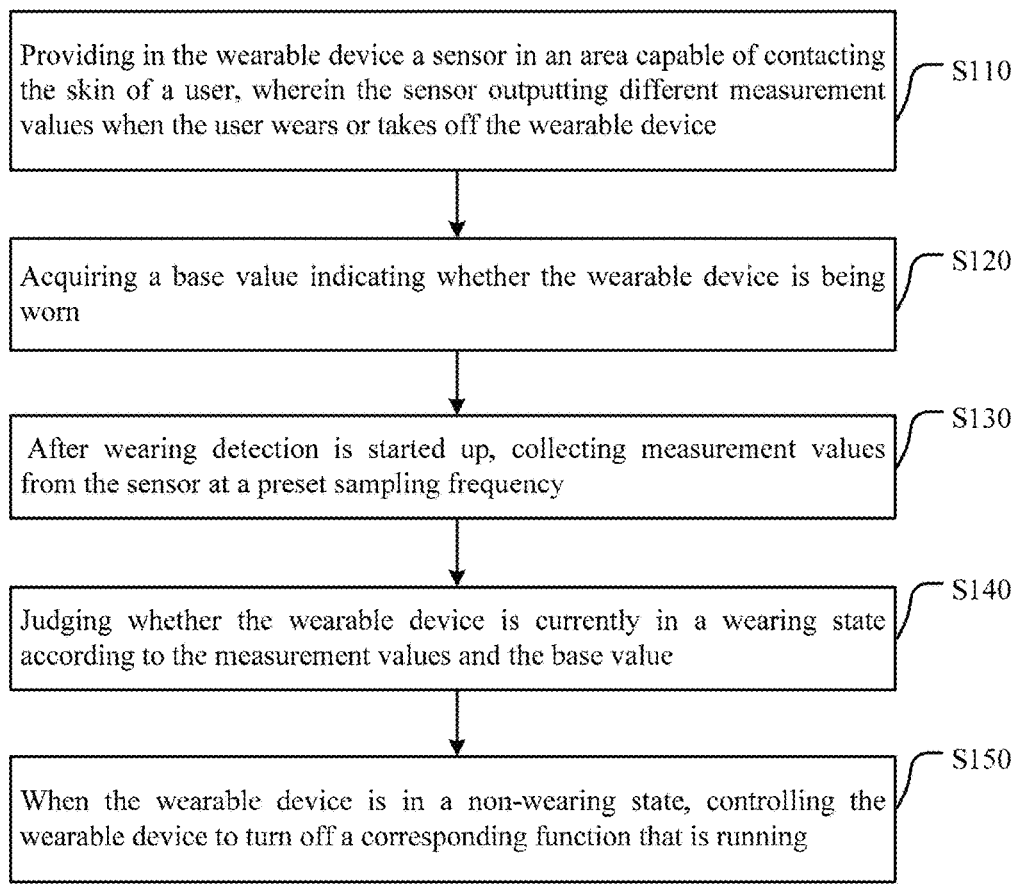
FIG. 1 shows a flow chart of a wearing state detection method for a wearable device according to an embodiment of the present disclosure.

FIG. 1 shows a flow chart of a wearing state detection method for a wearable device according to an embodiment of the present disclosure. As shown in FIG. 1, the method comprises:

Step S110, providing in the wearable device a sensor in an area capable of contacting the skin of a user, wherein the sensor outputting different measurement values when the user wears or takes off the wearable device.

Step S120, acquiring a base value indicating whether the wearable device is being worn.

In the step, the acquired base value indicates that the wearable device is not being worn, or, the acquired base value indicates that the wearable device is being worn.

Step S130, after wearing detection is started up, collecting measurement values from the sensor at a preset sampling frequency.

The process of the step of collecting the measurement values from the sensor according to the preset sampling frequency is a process of converting an analog signal that is outputted from the sensor into a digital signal.

Step S140, judging whether the wearable device is currently in a wearing state according to the measurement values and the base value.

Since the measurement values that are outputted from the sensor in the wearable device will be influenced by the temperature and humidity in the external environment, and at different temperatures or humidities, the measurement values in the same wearing state may vary, the step detects the wearing state of the wearable device based on both the measurement values and the base value, to avoid an error in the detection caused by detecting the wearing state of the wearable device solely based on the measurement values.

Step S150, when the wearable device is in a non-wearing state, controlling the wearable device to turn off a corresponding function that is running.

It can be seen that, the method shown in FIG. 1, realizes a novel wearing detection approach by providing a sensor at a proper location of the wearable device, using the characteristic that the sensor outputs different measurement values when the user wears or takes off the wearable device, and by combining the base value and a control logic. The present solution has a highly accurate wearing detection result, improves the usage comfort of the device while reducing unnecessary power consumption of the wearable device as much as possible, and can automatically stop a corresponding function that is running in the wearable device without any manual operation of the user when the wearable device has been taken off, which simplifies the operation of the user, improves the intellectualization, and meets the usage demand of the wearable device.

In some scenes, the measurement values that are collected from the sensor are not smooth, have noise interference, and have significant jitter, and thus cannot directly serve as the base for detecting the wearing state of the wearable device. Therefore, on the basis of the embodiment shown in FIG. 1, in another embodiment of the present disclosure, after collecting each of the measurement values from the sensor at the preset sampling frequency, each of the measurement values needs to be filtered to eliminate the interference in the measurement values, and then the subsequent detection process is performed by using the smoothed values of the measurement values, which can greatly improve the anti-interference performance of the detection, and ensure the accuracy of the detection result.

Preferably, the present embodiment employs smoothing filtering to remove the interference in the signal, wherein the approach of acquiring a smoothed value that corresponds to each of the collected measurement values is: regarding the current measurement value (the current measurement value refers to the measurement value that is currently being processed, the same hereinafter), comparing the current measurement value with a measurement value that was collected the previous time, and judging whether the absolute value of the difference (the absolute value of the difference refers to the absolute value of the value of the difference) therebetween is less than a first preset threshold. If the absolute value of the difference between the current measurement value and the measurement value that was collected the previous time is less than the first preset threshold, it is indicated that the current measurement value has no a significant jitter relative to the measurement value that was collected the previous time, and the current measurement value is not a suddenly changing value. The interference can be filtered by approaches such as median filtering and smoothing filtering, to acquire the smoothed value that corresponds to the current measurement value, for example, by using the smoothed value that corresponds to the measurement value that was collected the previous time and the current measurement value, calculating the smoothed value that corresponds to the current measurement value by filtering algorithm. If the absolute value of the difference between the current measurement value and the measurement value that was collected the previous time is not less than the first preset threshold, it is indicated that the current measurement value has a significant jitter relative to the measurement value that was collected the previous time, and a sudden change exists therebetween, and the current measurement value is not reliable, and therefore the corresponding smoothed value cannot be obtained by filtering. Therefore, the smoothed value that corresponds to the current measurement value in the present embodiment will maintain the smoothing result of the previous time, that is, the smoothed value that corresponds to the measurement value that was collected the previous time is used as the smoothed value that corresponds to the current measurement value.

During usage of the wearable device, events such as the adjusting by the user to the wearing position of the wearable device and radio-frequency interference can all result in the frequent varying in a short time of the measurement values that are outputted from the sensor, and if all of the wearing states that correspond to each of the measurement values are tracked and detected, the frequent varying of the measurement values will result in the frequent ON/OFF of the wearable device while the user wears a wearable device, which disturbs the user. In order to avoid that problem, the present embodiment adds the judging of the smoothness of the signal into the process of the wearing state detection of the wearable device, and if the signal satisfies the stableness condition, then detects the wearing state.

Exemplarily, the present embodiment, after acquiring the smoothed value that corresponds to the current measurement value, firstly judges whether the current measurement value is in the stable state; when the current measurement value is stable, then judges whether all of a preset number of measurement values before and after the current measurement value are in the stable state, or, judges whether all of a preset number of measurement values before the current measurement value are in the stable state; if yes, it is indicated that the signal satisfies the stableness condition, and then detects the present wearing state of the wearable device according to a smoothed value that corresponds to the current measurement value and the base value.

In that, the approach of judging whether the current measurement value is in the stable state is: comparing the current measurement value and the smoothed value that corresponds to the current measurement value, and judging whether an absolute value of a difference therebetween is less than a second preset threshold; if yes, it is indicated that the jitter of the current measurement value relative to the smoothed value is not significant, determining that the current measurement value is in the stable state; and if not, it is indicated that the jitter of the current measurement value relative to the smoothed value is significant, determining that the current measurement value is in an unstable state. The approach of judging whether all of a preset number of measurement values before and after the current measurement value are in the stable state or judging whether all of a preset number of measurement values before the current measurement value are in the stable state is: regarding each of a preset number of measurement values before and after the current measurement value or a preset number of measurement values before the current measurement value, comparing the measurement value and the smoothed value that corresponds to the measurement value, and judging whether an absolute value of a difference therebetween is less than a second preset threshold; if all of the absolute values of the difference that correspond to the respective measurement values are less than the second preset threshold, it is indicated that all of a plurality of measurement values that are collected within a time interval in which the collecting moment of the current measurement value is located are close to the corresponding smoothed values, determining that the signal that corresponds to the measurement value within the time interval is smooth.

After determining by the above approach that the signal satisfies the stableness condition, the present embodiment may judge whether the wearable device is in the wearing state according to the base value and the smoothed value that corresponds to the current measurement value. For example, the base value indicates that the wearable device is not being worn. The sensor in the wearable device outputs a relatively big measurement value when the wearable device is being worn, and outputs a relatively small measurement value when the wearable device has been taken off, therefore the judging the wearing state of the wearable device comprises: comparing the smoothed value that corresponds to the current measurement value and the base value, and when a value of a difference therebetween is greater than a third preset threshold, it is indicated that the smoothed value that corresponds to the current measurement value is big enough, and is far bigger than the base value that indicates that the wearable device is not being worn, determining that the wearable device is currently in the wearing state, and not changing the current operation state of the wearable device. When the value of a difference therebetween is not greater than the third preset threshold, it is indicated that the smoothed value that corresponds to the current measurement value is close to the base value, and at this point it can be preliminarily determined that the wearable device is in the non-wearing state. However, because it is required to change the operation state of the wearable device after detecting the non-wearing state of the wearable device so that the error in the detecting of the non-wearing state will affect the usage of the user, the detection of the non-wearing state of the wearable device should be more accurate. Accordingly, it is required to, after preliminarily determining that the wearable device is in the non-wearing state when the value of the difference between the smoothed value that corresponds to the current measurement value and the base value is not greater than the third preset threshold, further conduct the following processing:

if the value of the difference between the smoothed value that corresponds to the current measurement value and the base value is not greater than the third preset threshold, acquiring a detection result of the wearing state of the wearable device of the previous time; if the detection result of the previous time is that the wearable device is in the non-wearing state, it is indicated that the detection result that is currently preliminarily determined is the same as the detection result of the previous time, and determining that the wearable device is currently in the non-wearing state according to the continuity of the wearing state of the wearable device. If the detection result of the previous time is that the wearable device is in the wearing state, it is indicated that the detection result that is currently preliminarily determined is different from the detection result of the previous time, and has changed, at this point it is required to further judge the detection result that is preliminarily determined: judging whether a value of a difference between a maximum value among smoothed values that correspond to a preset number of measurement values before the current measurement value and the smoothed value that corresponds to the current measurement value, exceeds a fourth preset threshold, and if yes, it is indicated that the smoothed values that correspond to the measurement values that are collected within a duration till the collecting time that corresponds to the current measurement value, have continuously decreased by a certain extent, and in turn that the wearing state of the wearable device has changed within the duration, then determining that the wearable device is currently in the non-wearing state according to the detection result of the previous time, controlling the wearable device to turn off a corresponding function that is running; and if not, it is indicated that the smoothed values that correspond to the measurement values that are collected within a duration till the collecting time that corresponds to the current measurement value, do not decrease and change by a certain extent, and in turn that the wearing state of the wearable device has not changed within the duration, then determining that the wearable device is currently in the wearing state according to the detection result of the previous time, and maintaining the operation state of the wearable device unchanged.

The above description describes the process of detecting the wearing of the wearable device of the embodiment of the present disclosure, which needs to use the base value. When the wearable device is in different environments the corresponding base values are different, so in the process of wearing detection, it is required to track the base value according to a certain method, and update the base value. Therefore, in an embodiment of the present disclosure, after obtaining the detection result of the wearing state of the wearable device, the method shown in FIG. 1 further comprises: when it is determined that a base value updating condition is satisfied, updating the base value; and conducting a wearing state detection of the next time of the wearable device by using the updated base value; wherein after start-up, the wearable device conducts a first detection of the wearing state by using an initialized preset value as the base value, and the initialized preset value is obtained by the statistics on the historical base values for many times.

In that, when the base value indicates that the wearable device is not being worn, the base value updating condition may include two: one is: the current measurement value is in the stable state, all of a preset number of measurement values before and after the current measurement value are in the stable state or all of a preset number of measurement values before the current measurement value are in the stable state, and it is determined that the wearable device is currently in the non-wearing state, and the another is: the current measurement value is less than a fifth preset threshold. When the base value indicates that the wearable device is not being worn, the updating the base value comprises: calculating a preliminary base value by using the current measurement value and the base value; comparing the preliminary base value and the smoothed value that corresponds to the current measurement value, and if the preliminary base value is greater than the smoothed value, updating the base value by using the smoothed value; and if the preliminary base value is less than the smoothed value, updating the base value by using the preliminary base value.

When the base value indicates that the wearable device is being worn, the base value updating condition may include two: one is: the current measurement value is in the stable state, all of a preset number of measurement values before and after the current measurement value are in the stable state or all of a preset number of measurement values before the current measurement value are in the stable state, and it is determined that the wearable device is currently in the wearing state, and the another is: the current measurement value is greater than a preset threshold.

The particular numerical values of the above various preset thresholds may be determined according to the particular performance, the measuring accuracy that is expected to reach and so on of the wearable device.

In still another embodiment of the present disclosure, the above implementing process is described by taking the example that the wearable device is a smart earphone. However, the embodiments of the present disclosure are not limited to smart earphones, and are also suitable for wearable devices such as smart wristbands and smart glasses.

Figure 2:
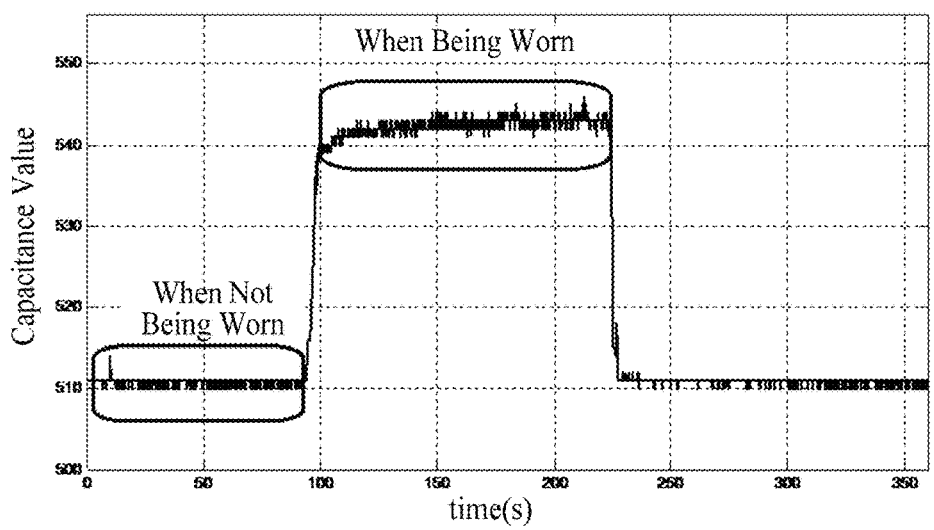
FIG. 2 shows a schematic diagram of a capacitive signal that is outputted by a capacitive sensor when the user wears and takes off a smart earphone according to an embodiment of the present disclosure.
Figure 6:
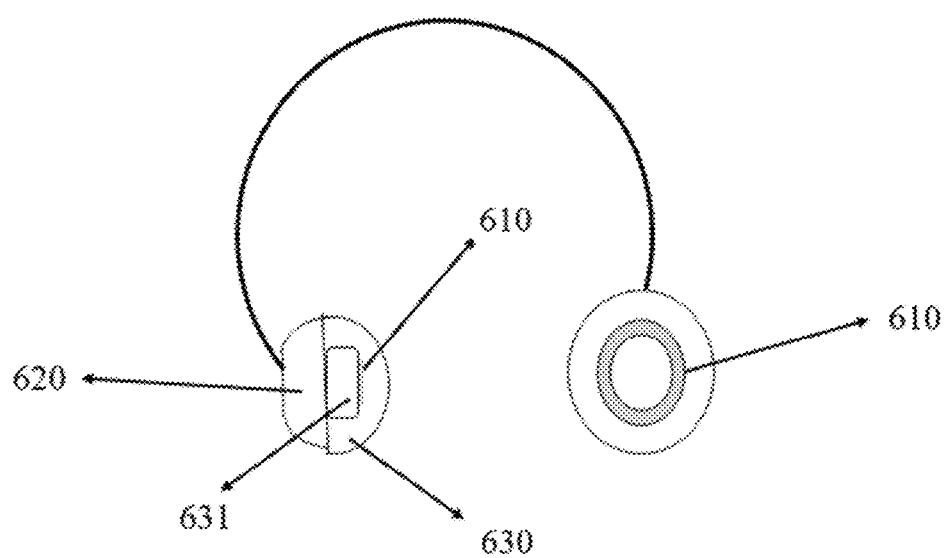
FIG. 6 shows a schematic diagram of a smart earphone according to an embodiment of the present disclosure.

In the present example, the wearable device is a smart earphone (as shown in FIG. 6), the sensor is a capacitive sensor, and the measurement values that are outputted from the capacitive sensor are capacitance values. FIG. 2 shows a schematic diagram of the capacitive signal that is outputted from the capacitive sensor when the user wears and takes off the smart earphone according to an embodiment of the present disclosure. As shown in FIG. 2, when the smart earphone is in the non-wearing state, the capacitance value that is outputted from the capacitive sensor is at a low level, and when the smart earphone is in the wearing state, the capacitance value that is outputted from the capacitive sensor is at a high level. Therefore, the wearing state of the smart earphone can be detected by using the capacitance value that is outputted from the capacitive sensor. In the present example, after the wearing detection is started up, the measurement values are collected from the capacitive sensor at a preset sampling frequency, and the measurement values are capacitance values.

Figure 3:
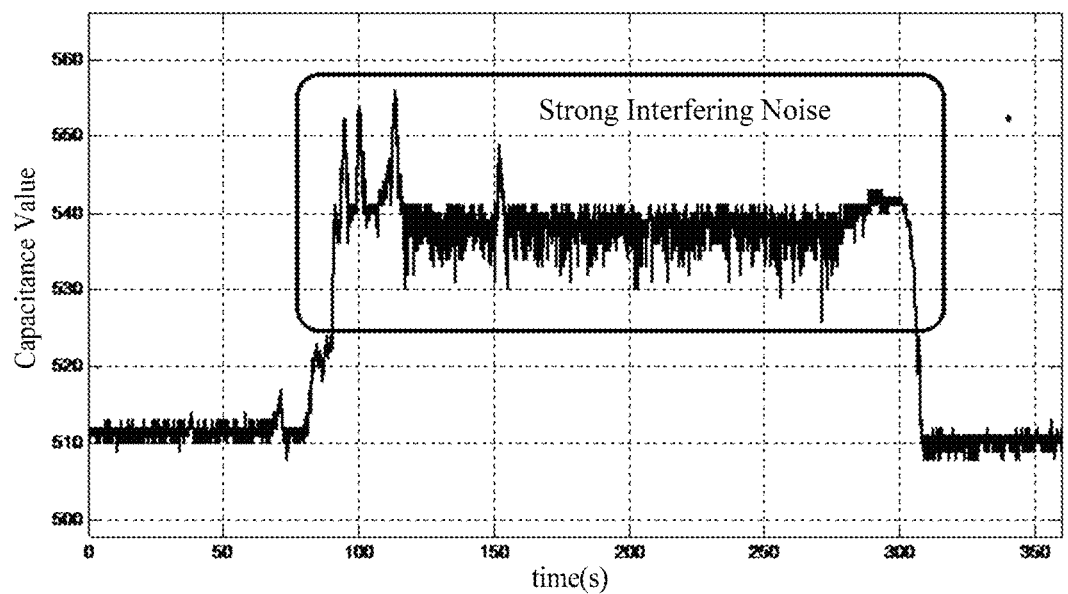
FIG. 3 shows a partial view of a capacitive signal that is outputted by a capacitive sensor according to an embodiment of the present disclosure.

In most cases the capacitive signal that is outputted from the capacitive sensor in the smart earphone has noise interference. As shown in FIG. 3, FIG. 3 shows a partial view of the capacitive signal that is outputted from the capacitive sensor according to an embodiment of the present disclosure. It can be seen that, the capacitance value that is outputted from the capacitive sensor has very strong interfering noise, and has a significant jitter, which will influence the detection result of the wearing state of the smart earphone. Accordingly, after collecting the capacitance value from the capacitive sensor, it is required to eliminate the influence from the noise interference by using a certain method.

The present example employs smoothing filtering method to conduct anti-interference processing to the capacitance value. Exemplarily, the collected current measurement value, that is, the current capacitance value, is recorded as SenData(n), wherein n represents the collecting moment of the current measurement value; the current capacitance value SenData(n) is compared with the capacitance value that was collected the previous time SenData(n−1), wherein (n−1) represents the collecting moment of the measurement value of the previous time; and if the absolute value of the difference therebetween is less than a first preset threshold, it is indicated that the capacitive signal that is collected this time and the capacitive signal that was collected the previous time are relatively smooth and do not have a significant jitter, and the smoothed value SmoothS(n) that corresponds to the present capacitance value SenData(n) is calculated through filtering algorithm by using the smoothed value SmoothS(n−1) that corresponds to the capacitance value that was collected the previous time SenData(n−1) and the current capacitance value SenData(n), wherein the calculating formula is as follows:

$$SmoothS(n)=SmoothS(n-1)\times alphaF+(1-alphaF)\times SenData(n);$$

wherein the alphaF is a first smoothing factor, and selecting a suitable smoothing factor can filter the interference in the capacitive signal while ensuring quickly tracking the original capacitance value that is outputted by the capacitive sensor selecting a suitable smoothing factor; and if the absolute value of the difference between the current capacitance value SenData(n) and the capacitance value that was collected the previous time SenData(n−1) is not less than the first preset threshold, it is indicated that the capacitive signals have jitter between this collection time and the previous collection time, then the smoothed value that corresponds to the measurement value that was collected the previous time is used as the smoothed value that corresponds to the current measurement value, that is, SmoothS(n)=SmoothS(n−1).

The above process of obtaining the smoothed value that corresponds to each of the capacitance values eliminates the interference from jitter, and more ideally reflects the capacitive signal that is collected from the capacitive sensor by using the smoothed value that corresponds to each of the capacitance values.

Subsequently, the wearing state of the smart earphone is detected according to the smoothed values that correspond to the above acquired capacitance values. However, during actual usage, some actions of the user will influence the capacitance value that is outputted from the capacitive sensor, causing the capacitance value that is collected from the capacitive sensor to frequently vary. For example, when the finger or arm of the user unintentionally contacts the smart earphone, the capacitance value that is outputted from the capacitive sensor will be changed. For example, when the user is wearing the smart earphone, the user may manually adjust the position of the earphone to wear it at a comfortable position, and such adjusting will cause the frequent changing of the capacitance value that is outputted from the capacitive sensor. All of those situations will cause the capacitance value that is collected from the capacitive sensor to frequently vary, and if the detection is done merely according to the current capacitance value or the smoothed value that corresponds to the current capacitance value, the detection result will be undoubtedly caused to continuously frequently vary, which affects the conformity between the detection result and the actual wearing state of the smart earphone. Accordingly, the strategy that the present embodiment employs is: detecting the wearing state of the smart earphone after determining that the capacitive signal that is outputted from the capacitive sensor is in the stable state to ensure the detection result to be accurate and effective, and not to affect the usage of the user.

Exemplarily, regarding the current capacitance value that is collected from the capacitive sensor this time SenData(n), firstly the current capacitance value SenData(n) and the smoothed value SmoothS(n) that corresponds to the current capacitance value SenData(n) are compared, and whether an absolute value of a difference therebetween is less than a second preset threshold is judged; when the absolute value of the difference therebetween is less than the second preset threshold, it is determined that the current measurement value is in the stable state; when the absolute value of the difference therebetween is not less than the second preset threshold, it is determined that the current measurement value is in an unstable state; and after determining that the current capacitance value SenData(n) is stable, whether all of N capacitance values before and after the current capacitance value SenData(n) are in the stable state is judged, or, whether all of N capacitance values before the current capacitance value SenData(n) are in the stable state is judged, and if all of the continuous N capacitance values that are collected from the capacitive sensor are in the stable state, then it is determined that the capacitive signal where the current capacitance value SenData(n) is located is in the stable state, and subsequently the wearing state detection of the smart earphone is conducted by using the present capacitance value; wherein the N is selected according to the practical demands, and in a particular example the selected numerical value of N is the number of the capacitance values that are sampled within 0.5 second.

The temperature and humidity in the environment will influence the amplitude of the capacitance value that is outputted from the capacitive sensor, and if merely the current capacitance value that is collected from the capacitive sensor and/or the absolute value of the smoothed value that corresponds to the current capacitance value is used as the base of detection, the change of the temperature and humidity in the environment may probably cause error in detection. Accordingly, the present solution employs the method of comparing the smoothed value SmoothS(n) that corresponds to the current capacitance value SenData(n) and the base value Baseline to judge whether the smart earphone is in the wearing state, wherein the base value Baseline indicates the corresponding outputted value of the capacitive sensor when the wearable device is not being worn, and because the base value Baseline has not been updated when detecting the wearing state according to the current capacitance value SenData(n), the comparing with the current capacitance value SenData(n) employs the base value Baseline(n−1) after the updating of the previous time.

In the present example, the process comprises comparing the smoothed value SmoothS(n) that corresponds to the current capacitance value SenData(n) and the base value Baseline(n−1), and when a value of a difference therebetween is greater than a third preset threshold, it is indicated that the current capacitance value SenData(n) is big enough compared with the base value Baseline(n−1), it is determined that the wearable device is currently in the wearing state; and when the value of the difference therebetween is not greater than the third preset threshold, it is indicated that the current capacitance value SenData(n) is close to the base value Baseline(n−1), it is determined that the smart earphone is currently in the non-wearing state.

Further, in the process of detecting the wearing state of the smart earphone during actual usage of the smart earphone, when determining that the smart earphone is currently in the non-wearing state, the smart earphone is controlled to stop the function that is running. Moreover, if the detection result of the non-wearing state of the smart earphone is not conform with the actual state, that is, error in detection, the function that the user is using will suddenly stop or turn off, and if the music player in the smart earphone is turned off when the user is listening to music, the user will has a very bad experience. It can be seen that, the degree of the fault tolerance of the detection of the non-wearing state of the wearable device should be far lower than the degree of the fault tolerance of the detection of the wearing state of the wearable device. Therefore, the present solution further proposes preferable embodiments to optimize the above detection process of determining that the wearable device is in the non-wearing state, to further improve the accuracy of the detection of the non-wearing state of the wearable device.

Exemplarily, when it is determined that the value of the difference between the smoothed value SmoothS(n) that corresponds to the current capacitance value SenData(n) and the base value Baseline(n−1) is not greater than the third preset threshold, the detection result that the smart earphone is in the non-wearing state is used as a detection result to be optimized of this time; the detection result of the previous time of the wearing state of the smart earphone is acquired, and if the detection result of the previous time is that the smart earphone is in the non-wearing state, then the detection result to be optimized of this time is conform with the detection result of the previous time, it can be determined from the view of state continuation that the smart earphone is currently in the non-wearing state; and if the detection result of the previous time is that the smart earphone is in the wearing state, then the detection result to be optimized of this time is opposite to the detection result of the previous time, the detection result to be optimized of this time is optimized, whether the value of the difference between the maximum value among the smoothed values that correspond to a preset number of capacitance values before the current capacitance value SenData(n) and the smoothed value SmoothS(n) that corresponds to the current capacitance value SenData(n) exceeds a fourth preset threshold judged, and if yes, it is indicated that the smoothed values that correspond to the capacitance values that are collected from the capacitive sensor within a preset collecting time duration have continuously decreased by a certain extent, it is determined that the smart earphone is currently in the non-wearing state, and if not, it is determined that the smart earphone is currently in the wearing state.

Finally, the detection result of the current wearing state of the smart earphone is output, and when the smart earphone is currently in the non-wearing state, control the smart earphone to turn off the function that is running in the smart earphone.

After detecting the wearing state of the smart earphone, if the capacitive signal where the current capacitance value SenData(n) is located is in the stable state and it is determined that the smart earphone is currently in the non-wearing state, or, when the current capacitance value is small enough, for example, less than a fifth preset threshold, then the base value Baseline is updated, that is, the base value Baseline(n−1) after the updating of the previous time is taken as the base value Baseline(n) after the updating of this time. Firstly a preliminary base value BaselineBuf(n) after the updating of this time is calculated through a filtering algorithm by using Baseline(n−1) after the updating of the previous time and the current capacitance value SenData(n), wherein the calculating formula is as follows:

$$BaselineBuf(n)=Baseline(n-1)\times alphaS+(1-alphaS)\times SenData(n);$$

wherein the alphaS is the second smoothing factor, and because the capacitance value that is outputted from the capacitive sensor when the smart earphone is being worn must be greater than the capacitance value that is outputted when the smart earphone is not being worn, the base value Baseline(n) will not be greater than the smoothed value SmoothS(n) that corresponds to the current capacitance value SenData(n), accordingly by comparing the calculated preliminary base value BaselineBuf(n) and the smoothed value SmoothS(n) that corresponds to the current capacitance value SenData(n), the smaller one is used as the base value Baseline(n) after the updating of this time, to be used in the wearing state detection of the smart earphone in the next time.

In the above the principle of the wearing state detection of the wearable device is described by taking the example wherein the wearable device is a smart earphone and the sensor in the wearable device is a capacitive sensor. In the other examples of the present disclosure, the wearable device may be other types of wearable devices such as a smart wristband, a smart watch and a smart waistband, and the sensor in the wearable device may be other types of sensors that can output different measurement values when the wearable device is being worn and when the wearable device has been taken off such as a capacitive sensor, a resistance-type pressure sensor and a piezoelectric sensor, which can conduct accurate and effective detection on the basis of the above principle.

In the embodiments of the present disclosure, after starting up the wearable device, before detecting the wearing state of the wearable device for the first time, it is required to firstly conduct initialization, by conducting initialization value assignment to the base value and the variables such as the historical measurement values and the smoothed values that correspond to the historical measurement values, to in the process of the first detection provide a calculating base for the processing of the current measurement values in the process of smoothing, in the process of smoothness determining, in the process of detection result determining, in the process of base values updating and so on.

Figure 4:
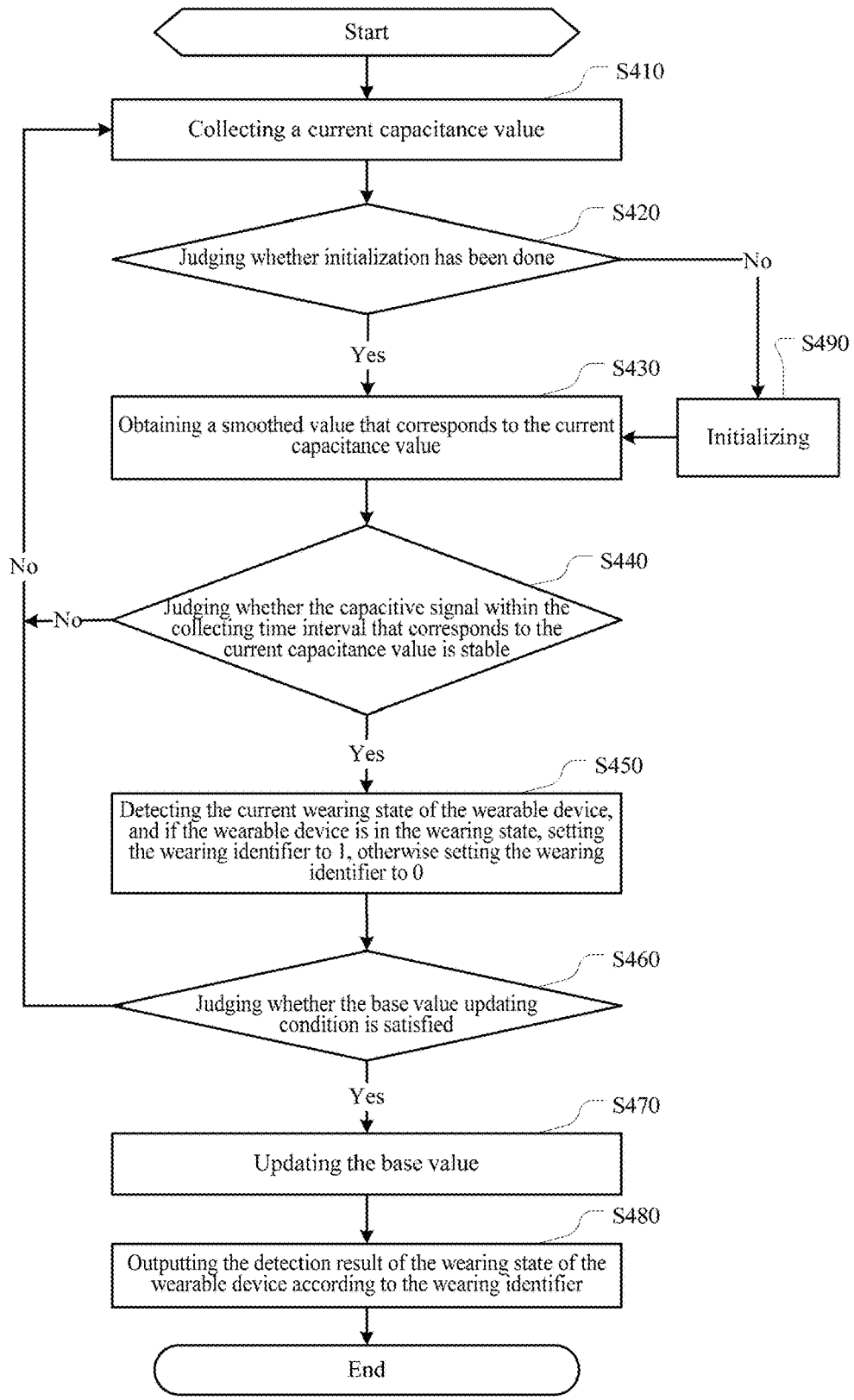
FIG. 4 shows a flow chart of wearing state detection method for a wearable device according to another embodiment of the present disclosure.

FIG. 4 shows a flow chart of a wearing state detection method for a wearable device according to another embodiment of the present disclosure, which describes the process of conducting the wearing state detection for the first time after the start-up of the wearable device, wherein the sensor provided in the wearable device is a capacitive sensor, and the capacitance values that are outputted from the capacitive sensor are different when the wearable device is being worn and when the wearable device has been taken off. As shown in FIG. 4, the method comprises:

Step S410, collecting a current capacitance value.

Step S420, judging whether initialization has been done, and if yes executing Step S430, and if not executing Step S490.

Step S430, obtaining a smoothed value that corresponds to the current capacitance value.

Step S440, judging whether the capacitive signal within the collecting time interval that corresponds to the current capacitance value is stable, and if yes executing Step S450, and if not returning to Step S410.

Step S450, detecting the current wearing state of the wearable device, and if the wearable device is in the wearing state, setting the wearing identifier to 1, and if the wearable device is in the non-wearing state, setting the wearing identifier to 0.

Step S460, judging whether the base value updating condition is satisfied, and if yes executing Step S470, and if not returning to Step S410.

Step S470, updating the base value.

Step S480, outputting the detection result of the wearing state of the wearable device according to the wearing identifier.

Step S490, initializing, and subsequently executing Step S430.

Correspondingly to the above method, the present application further provides a wearable device, comprising a processor and a machine-readable storage medium, the machine-readable storage medium stores a machine executable instruction that is executable by the processor, and the processor executes the machine executable instruction to implement the steps of the above wearing state detection method for a wearable device.

In addition, the embodiments of the present disclosure further provide a machine-readable storage medium storing a machine executable instruction, and when invoked and executed by the processor, the machine executable instruction causes the processor to: implement the steps of the above wearing state detection method for a wearable device.

Regarding hardware, the wearable device of the present application comprises a processor, an internal bus, a network interface, a volatile memory, and a nonvolatile memory, and, according to the actual functions of the wearable device, may further comprise other hardware components, which is not discussed here further.

In the different embodiments, the nonvolatile memory may be: a storage driver (such as a hard disk driver), a solid state disk, any type of memory discs (such as an optical disk, DVD and so on), or like storage media, or a combination thereof. The volatile memory may be: RAM (Random Access Memory). Further, the nonvolatile memory and the volatile memory, as the machine-readable storage medium, may store thereon the machine executable instruction that corresponds to the wearing state detection method for a wearable device that is executed by the processor.

Figure 5:
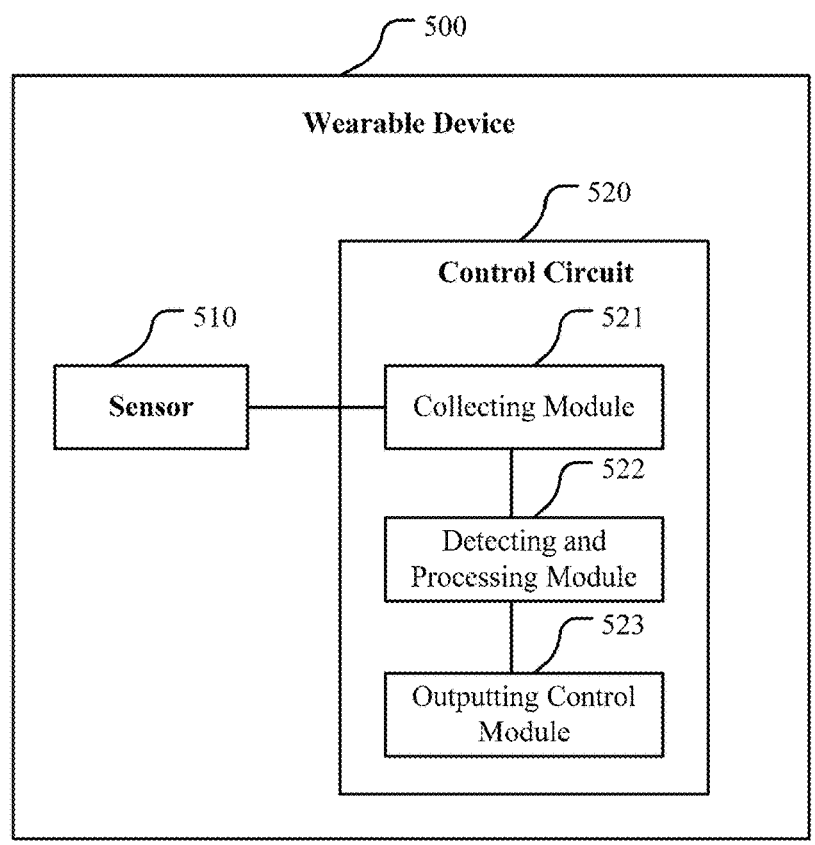
FIG. 5 shows a schematic diagram of a wearable device according to an embodiment of the present disclosure.

FIG. 5 shows the schematic diagram of the wearable device according to an embodiment of the present disclosure. As shown in FIG. 5, the wearable device 500 comprises: a sensor 510 and a control circuit 520.

The sensor 510 is provided in the wearable device 500 in an area capable of contacting the skin of a human body, when the sensor 510 outputs different measurement values when the user wears or takes off the wearable device 500. The control circuit 520 comprises: a collecting module 521, a detecting and processing module 522 and an outputting control module 523.

The collecting module 521 connects to the sensor 510, and after wearing detection has been started up, the collecting module 521 collects measurement values from the sensor 510 at a preset sampling frequency. The detecting and processing module 522 connects to the collecting module 521, and the detecting and processing module 522 receives the measurement values that are collected by the collecting module 521, acquires a base value indicating whether the wearable device 500 is being worn, and judges whether the wearable device 500 is currently in a wearing state according to the measurement values and the base value. The detecting and processing module 522 connects to the outputting control module 523, the detecting and processing module 522 notifies the outputting control module 523 when detecting that the wearable device 500 is in the non-wearing state, and the outputting control module 523 controls the wearable device 500 to turn off a corresponding function that is running.

It can be seen that, the wearable device shown in FIG. 5 provides a sensor in the specified region of the wearable device, and realizes a novel wearing detection approach by using the characteristic that the sensor that contacts with the skin outputs different measurement values when the user wears or takes off the wearable device and by combining the base value and the control logic. The wearing detection result of the present solution has a high accuracy, which improves the usage comfort of the device while reducing unnecessary power consumption of the wearable device as much as possible. Moreover, when the wearable device has been taken off, the corresponding function that is running in the wearable device can be automatically stopped without the manual operation of the user, which simplifies the operation of the user, improves the intellectualization, and meets the usage demand of the wearable device.

In an embodiment of the present disclosure, the detecting and processing module 522 acquires a smooth value that corresponds to each of the measurement values that are collected by the collecting module 521, judges whether the current measurement value is in a stable state regarding a current measurement value, and when the current measurement value is stable, judges whether all of a preset number of measurement values before and after the current measurement value are in the stable state, or, judges whether all of a preset number of measurement values before the current measurement value are in the stable state; and if yes, judges whether the wearable device 500 is currently in the wearing state according to a smoothed value that corresponds to the current measurement value and the base value.

In that, the detecting and processing module 522 compares the current measurement value with a measurement value that was collected the previous time, and judging whether an absolute value of a difference therebetween is less than a first preset threshold; if yes, calculating the smoothed value that corresponds to the current measurement value by using a smoothed value that corresponds to the measurement value that was collected the previous time and the current measurement value; and if not, using the smoothed value that corresponds to the measurement value that was collected the previous time as the smoothed value that corresponds to the current measurement value.

In an embodiment of the present disclosure, the detecting and processing module 522 compares the current measurement value and the smoothed value that corresponds to the current measurement value, and judges whether an absolute value of a difference therebetween is less than a second preset threshold; and if yes, determines that the current measurement value is in the stable state; and if not, determines that the current measurement value is in an unstable state.

In an embodiment of the present disclosure, the detecting and processing module 522 compares the smoothed value that corresponds to the current measurement value and the base value, and when a value of a difference therebetween is greater than a third preset threshold, determines that the wearable device 500 is currently in the wearing state; wherein the base value indicates that the wearable device 500 is not being worn.

In an embodiment of the present disclosure, when the value of the difference between the smoothed value that corresponds to the current measurement value and the base value is not greater than the third preset threshold, the detecting and processing module 522 acquires a detection result of the wearing state of the wearable device 500 of the previous time; if the detection result of the previous time is that the wearable device 500 is in the non-wearing state, determines that the wearable device 500 is currently in the non-wearing state; and if the detection result of the previous time is that the wearable device 500 is in the wearing state, judges whether a value of a difference between a maximum value among smoothed values that correspond to a preset number of measurement values before the current measurement value and the smoothed value that corresponds to the current measurement value, exceeds a fourth preset threshold, and if yes, determines that the wearable device 500 is currently in the non-wearing state, and if not, determines that the wearable device 500 is currently in the wearing state.

In an embodiment of the present disclosure, the detecting and processing module 522 further updates the base value when it is determined that a base value updating condition is satisfied; conducts a wearing state detection of the next time of the wearable device 500 by using the updated base value; wherein when the base value indicates that the wearable device 500 is not being worn, the base value updating condition is: the current measured value is in the stable state, all of a preset number of measurement values before and after the current measurement value are in the stable state or all of a preset number of measurement values before the current measurement value are in the stable state, and it is determined that the wearable device 500 is currently in the non-wearing state, or, the current measurement value is less than a fifth preset threshold; and when the base value indicates that the wearable device 500 is being worn, the base value updating condition is: the current measurement value is in the stable state, all of a preset number of measurement values before and after the current measurement value are in the stable state or all of a preset number of measurement values before the current measurement value are in the stable state, and it is determined that the wearable device 500 is currently in the wearing state, or, when the current measurement value is greater than a preset threshold.

In an embodiment of the present disclosure, the detecting and processing module 522 calculates a preliminary base value by using the current measurement value and the base value; compares the preliminary base value and the smoothed value that corresponds to the current measurement value, and if the preliminary base value is greater than the smoothed value, updates the base value by using the smoothed value; and if the preliminary base value is less than the smoothed value, updates the base value by using the preliminary base value.

FIG. 6 shows the schematic diagram of the smart earphone according to an embodiment of the present disclosure. As shown in FIG. 6, the smart earphone 600 comprises a sensor 610, a control circuit (not shown in the figure), an earphone tail 620 and an earphone cover 630.

In that, the operating principles of the sensor 610 and the control circuit are respectively the same as those of the sensor 510 and the control circuit 520 shown in FIG. 5, which is not discussed here further.

The control circuit is provided in the earphone tail 620. The sensor 610 is a capacitive sensor. The sensor 610 is provided at a preset position in the smart earphone 600, and the preset position corresponds to an area of the earphone cover 630 that is able to contact the skin of a human ear. The measurement values, that is, capacitance values, that are outputted from the sensor 610 are different when the user wears or takes off the smart earphone.

Exemplarily, a protrusion 631 for clipping the earphone cover 630 is provided on an inner edge of the earphone cover 630, and the protrusion 631 protrudes toward a side of the earphone cover 630. The sensor 610 is provided at a top of the protrusion. When the smart earphone 600 is being worn, the sensor 610 and the human ear form a capacitor. When the dielectric constant is constant, both of the contact area and the distance of the two poles of the capacitor formed by the sensor 610 and the human ear influence the measurement values, that is, the capacitance values. Because the human ear is a cavity of an irregular shape, in order to ensure that the sensor 610 and the human ear can form an effective capacitor, it is required to ensure the contact area therebetween. Therefore, the present example selects a material that has a certain area and has electric conductivity as the capacitive sensor. Exemplarily, considering the cost and the electric conductivity, a copper foil of a closed loop shape is provided at the protruding top portion of the protrusion of the smart earphone to serve as the sensor 610.

In an alternative implementation, the copper foil of closed loop shape is formed by two or more concentric rings.

In another implementation, the shape of the copper foil serving as the sensor 610 may also be anon-closed loop shape. The non-closed loop shape takes consideration of the influence that may be brought to the sensor 610 by the contact between the hand and the earphone cover when the user is wearing or adjusting the smart earphone 600 by hand, and in order to avoid the influence, a notch is provided at a position of the copper foil that corresponds to the position which can be easily contacted by the hand, which conforms to the custom of the user, to form the non-closed loop shape. In other implementations, the shape of the copper foil serving as the sensor 610 may also be round, half round or sectorial, all of which are aimed to increase the contact area of the capacitor formed by the sensor 610 and the human ear as best as possible, to increase the sensitivity of the sensor 610, and to enable the configuration of the sensor to flexibly adapt the internal structure of the wearable device, and not affect the other elements in the wearable device.

As shown in FIG. 6, the smart earphone 600 is a head-mounted earphone, and comprises two earphone tails 620, two earphone covers 630 and one connecting portion. Each of the earphone covers 630 covers one earphone tail 620 to form one earphone head, and the two earphone tails 620 are connected by the connecting portion. At least one of the earphone heads is provided therein with the control circuit and the sensor 610.

In an embodiment of the present disclosure, the sensor 610 may be a resistance-type pressure sensor or piezoelectric sensor.

In an embodiment of the present disclosure, the smart earphone 600 further comprises: a Bluetooth module and/or a WiFi module, and the Bluetooth module and/or WiFi module is provided in the control circuit of the earphone tail 620.

It should be noted that, the embodiments of the devices shown in FIGS. 5-6 are correspondingly the same as the embodiments shown in FIGS. 1-4 the above, which has been in detail described in the above and is not described further here.

In conclusion, in order to improve the accuracy of the wearing state detection of the wearable device, the technical solution provided by the embodiments of the present disclosure, according to the difference between the measurement values that are outputted from the sensor when the wearable device is being worn and when the wearable device is not being worn, provides the sensor in a specified region of the wearable device, and after wearing detection has been started up, obtains the detection result of the present wearing state of the wearable device by using the measurement values that are outputted from the sensor and the base value that indicates whether the wearable device is being worn. The detection process employs a plurality of the approaches of anti-interference processing, such as smoothness processing, stability judging, and some judging logics to improve the effectiveness and accuracy of the wearing state detection of the wearable device, and in turn controls the wearable device according to the detection result, which realizes a technical effect that when the wearable device has been taken off, the function that is running in the wearable device can stop without manual operation, to reduce the unnecessary power consumption of the wearable device, and meet the usage demand of the wearable device.

The above descriptions are merely preferable embodiments of the present disclosure, and are not limiting the protection scope of the embodiments. Any modifications, equivalent substitutions or improvements that are made within the spirit and principle of the embodiments of the present disclosure are all included in the protection scope of the embodiments of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A wearing state detection method for a wearable device, wherein the method comprises:
   providing in the wearable device a sensor in an area capable of contacting the skin of a user, wherein the sensor outputs different measurement values when the user wears or takes off the wearable device;
   acquiring a base value indicating whether the wearable device is being worn;
   after wearing detection has been started up, collecting measurement values from the sensor at a preset sampling frequency;
   judging whether the wearable device is currently in a wearing state according to the measurement values and the base value; and
   controlling the wearable device to turn off a corresponding function that is running when the wearable device is in a non-wearing state;
   wherein the judging whether the wearable device is currently in a wearing state according to the measurement values and the base value comprises:
   acquiring a smoothed value that corresponds to each of the collected measurement values;
   regarding a current measurement value, judging whether the current measurement value is in a stable state;
   when the current measurement value is stable, judging whether all of a preset number of measurement values before and after the current measurement value are in the stable state, or, judging whether all of a preset number of measurement values before the current measurement value are in the stable state; and
   if yes, judging whether the wearable device is currently in the wearing state according to a smoothed value that corresponds to the current measurement value and the base value.

2. The method according to claim 1, wherein the acquiring a smoothed value that corresponds to each of the collected measurement values comprises:
   regarding a current measurement value, comparing the current measurement value with a measurement value that was collected the previous time, and judging whether an absolute value of a difference therebetween is less than a first preset threshold;
   if yes, calculating the smoothed value that corresponds to the current measurement value by using a smoothed value that corresponds to the measurement value that was collected the previous time and the current measurement value; and
   if not, using the smoothed value that corresponds to the measurement value that was collected the previous time as the smoothed value that corresponds to the current measurement value.

3. The method according to claim 1, wherein the judging whether the current measurement value is in a stable state comprises:
   comparing the current measurement value and the smoothed value that corresponds to the current measurement value, and judging whether an absolute value of a difference therebetween is less than a second preset threshold;
   if yes, determining that the current measurement value is in the stable state; and
   if not, determining that the current measurement value is in an unstable state.

4. The method according to claim 1, wherein the judging whether the wearable device is currently in the wearing state according to a smoothed value that corresponds to the current measurement value and the base value comprises:
   comparing the smoothed value that corresponds to the current measurement value and the base value, and when a value of a difference therebetween is greater than a third preset threshold, determining that the wearable device is currently in the wearing state;
   wherein the base value indicates that the wearable device is not being worn.

5. The method according to claim 4, wherein the judging whether the wearable device is currently in the wearing state further according to a smoothed value that corresponds to the current measurement value and the base value comprises:
   if the value of the difference between the smoothed value that corresponds to the current measurement value and the base value is not greater than the third preset threshold, acquiring a detection result of the wearing state of the wearable device of the previous time;
   if the detection result of the previous time is that the wearable device is in the non-wearing state, determining that the wearable device is currently in the non-wearing state; and
   if the detection result of the previous time is that the wearable device is in the wearing state, judging whether a value of a difference between a maximum value among smoothed values that correspond to a preset number of measurement values before the current measurement value and the smoothed value that corresponds to the current measurement value, exceeds a fourth preset threshold, and if yes, determining that the wearable device is currently in the non-wearing state, and if not, determining that the wearable device is currently in the wearing state.

6. The method according to claim 1, wherein the method further comprises:
when it is determined that a base value updating condition is satisfied, updating the base value; and
conducting a wearing state detection of the next time of the wearable device by using the updated base value;
wherein when the base value indicates that the wearable device is not being worn, the base value updating condition is:
the current measurement value is in the stable state, all of a preset number of measurement values before and after the current measurement value are in the stable state or all of a preset number of measurement values before the current measurement value are in the stable state, and it is determined that the wearable device is currently in the non-wearing state; and
when the base value indicates that the wearable device is being worn, the base value updating condition is:
the current measurement value is in the stable state, all of a preset number of measurement values before and after the current measurement value are in the stable state or all of a preset number of measurement values before the current measurement value are in the stable state, and it is determined that the wearable device is currently in the wearing state.

7. The method according to claim 6, wherein the updating the base value comprises: calculating a preliminary base value by using the current measurement value and the base value;
comparing the preliminary base value and the smoothed value that corresponds to the current measurement value, and if the preliminary base value is greater than the smoothed value, updating the base value by using the smoothed value; and
if the preliminary base value is less than the smoothed value, updating the base value by using the preliminary base value.

8. The method according to claim 1, wherein the method further comprises:
when it is determined that a base value updating condition is satisfied, updating the base value; and
conducting a wearing state detection of the next time of the wearable device by using the updated base value;
wherein when the base value indicates that the wearable device is not being worn, the base value updating condition is: the current measurement value is less than a fifth preset threshold; and
when the base value indicates that the wearable device is being worn, the base value updating condition is: the current measurement value is greater than a preset threshold.

9. A wearable device, wherein the wearable device comprises: a sensor and a control circuit;
the sensor is provided in the wearable device in an area capable of contacting the skin of a human body, wherein the sensor outputs different measurement values when the user wears or takes off the wearable device;
the control circuit comprises: a collecting module, a detecting and processing module and an outputting control module;
the collecting module connects to the sensor, and after wearing detection has been started up, the collecting module collects measurement values from the sensor at a preset sampling frequency;
the detecting and processing module connects to the collecting module, and the detecting and processing module receives the measurement values that are collected by the collecting module, acquires a base value indicating whether the wearable device is being worn, and judges whether the wearable device is currently in a wearing state according to the measurement values and the base value; and
the detecting and processing module connects to the outputting control module, the detecting and processing module notifies the outputting control module when detecting that the wearable device is in the non-wearing state, and the outputting control module controls the wearable device to turn off a corresponding function that is running;
wherein the detecting and processing module acquires a smooth value that corresponds to each of the measurement values that are collected by the collecting module, and regarding a current measurement value, judges whether the current measurement value is in a stable state, when the current measurement value is stable, judges whether all of a preset number of measurement values before and after the current measurement value are in the stable state, or, judges whether all of a preset number of measurement values before the current measurement value are in the stable state; and if yes, judges whether the wearable device is currently in the wearing state according to a smoothed value that corresponds to the current measurement value and the base value.

10. The wearable device according to claim 9, wherein the wearable device is a smart earphone, and the smart earphone comprises an earphone tail and an earphone cover;
the control circuit is provided in the earphone tail; and
a protrusion for clipping the earphone cover is provided on an inner edge of the earphone cover, and the protrusion protrudes toward a side of the earphone cover; and the sensor is provided at a top of the protrusion.

11. The wearable device according to claim 10, wherein the sensor is a capacitive sensor formed by a copper foil, and a shape of the copper foil is a closed loop shape or an unclosed loop shape.

12. The wearable device according to claim 10, wherein the sensor is a resistance-type pressure sensor or piezoelectric sensor.

* * * * *